(12) United States Patent
Krasovsky et al.

(10) Patent No.: US 8,749,553 B1
(45) Date of Patent: Jun. 10, 2014

(54) SYSTEMS AND METHODS FOR ACCURATELY PLOTTING MATHEMATICAL FUNCTIONS

(75) Inventors: Ariel Krasovsky, Tel Aviv (IL); Roi Rubins, Ramat-Gan (IL); Adi Avidor, Tel Aviv (IL)

(73) Assignee: Google Inc., Mountain View, CA (US)

( * ) Notice: Subject to any disclaimer, the term of this patent is extended or adjusted under 35 U.S.C. 154(b) by 231 days.

(21) Appl. No.: 13/303,977

(22) Filed: Nov. 23, 2011

Related U.S. Application Data

(60) Provisional application No. 61/545,029, filed on Oct. 7, 2011.

(51) Int. Cl.
*G06T 11/20* (2006.01)
(52) U.S. Cl.
USPC ........................................................ 345/440
(58) Field of Classification Search
USPC ........................................................ 345/440
See application file for complete search history.

(56) References Cited

U.S. PATENT DOCUMENTS

2008/0250347 A1* 10/2008 Gray et al. ............... 715/808
2011/0187720 A1* 8/2011 Pedersen .................. 345/442

* cited by examiner

*Primary Examiner* — David Zarka
*Assistant Examiner* — Vu Nguyen
(74) *Attorney, Agent, or Firm* — Harrity & Harrity, LLP

(57) ABSTRACT

Technology is described herein for quickly, efficiently and accurately rendering a plot of the mathematical function within an interactive graph on a web page, such as a search results web page. The technology includes determining a sampling resolution indicating the points of the mathematical function to be plotted within a display region of the plot. The sampling resolution includes a higher number of sample points in sections of the mathematical function with function values that change considerably, and includes a lower number of sample points in sections with function values that change slightly. The interactive graph provides the user with a rich interactive experience that facilitates and encourages the user's understanding of mathematical concepts and underlying principles.

36 Claims, 14 Drawing Sheets

SYSTEMS AND METHODS FOR ACCURATELY PLOTTING MATHEMATICAL FUNCTIONS

CROSS-REFERENCE TO RELATED APPLICATIONS

This application claims the benefit of U.S. Provisional Application No. 61/545,029, entitled "Systems and Methods for Providing Interactive Graphs of Mathematical Functions" filed 7 Oct. 2011, which is incorporated by reference herein.

BACKGROUND

The present invention relates to information retrieval systems. In particular, it relates to systems and methods for categorizing a query representing a mathematical function, and embedding an interactive graph of the mathematical function within a search results web page.

Various computer software packages and devices such as graphing calculators enable users to graph mathematical functions. A graph allows a user to visualize the mathematical function, in a manner that can aid in the understanding of abstract mathematical concepts. For example, when a student is learning a new concept that involves a mathematical function, a graph of the function can provide a better understanding of the underlying principles.

However, these computer software packages and devices can be difficult to learn and time consuming to use. A student learning a new mathematical concept may not have the knowledge necessary to correctly graph a mathematical function using these computer software packages and devices. In such a case, the student is unable to utilize a graph of the mathematical function as a learning tool.

It is therefore desirable to provide techniques for graphing mathematical functions in a manner that is convenient and useful for the user.

SUMMARY

In one implementation, a method is described for displaying a graph of a mathematical function on a web page. The method includes dividing, using a computing device, a range of variable values of an independent variable in the mathematical function into a plurality of sub-ranges. The method further includes selecting a plurality of initial variable sample values within a particular sub-range of the plurality of sub-ranges. Function values are then calculated for corresponding initial variable sample values of the plurality of initial variable sample values within the particular sub-range. The method further includes determining that a difference between the calculated function values exceeds a threshold value. The particular sub-range is then modified by adding at least one additional sample variable value to the particular sub-range in response to the determination. A graph of the mathematical function is then plotted on the web page based on the modified particular sub-range.

This method and other implementations of the technology disclosed can each optionally include one or more of the following features.

Modifying the particular sub-range can include adding a plurality of additional sample variable values to the particular sub-range.

Adding the plurality of additional sample variable values to the particular sub-range can include calculating function values for additional sample variable values within the particular sub-range, until a difference between calculated function values is less than the threshold value.

The determination can include determining that a pair of initial sample variable values have a difference between corresponding calculated function values that exceeds the threshold value. Modifying the particular sub-range can include adding the at least one additional sample variable value between the initial sample variable values in the pair.

The determination can include determining that a difference between a minimum function value and a maximum function value within the particular sub-range exceeds the threshold value.

The determination can include determining that a difference between derivatives of the calculated function values exceeds the threshold value. Determining the difference between the derivatives can include determining that one derivative has one of a positive and a negative value, and remaining derivatives have the other of the positive and negative value.

The method can further include selecting points from among the calculated function values and the corresponding initial and additional sample variable values within the particular sub-range for use in plotting the mathematical function. The method can also include rejecting points for use in plotting the mathematical function that have function values that are undefined for corresponding sample variable values. Plotting the graph can include displaying the selected points on the plot, and not displaying the rejected points on the plot.

The method can further include selecting a second plurality of initial variable sample values within a second sub-range of the plurality of sub-ranges. Function values can then be calculated for corresponding initial variable sample values of the second plurality of initial variable sample values within the second sub-range. The method can also include determining that a difference between the calculated function values within the second sub-range is less than a second threshold value. The method can also include determining one or more approximate points for use in plotting the mathematical function within the second sub-range. The one or more approximate points can have values based on the calculated function values within the second sub-range, and plotting the graph can include displaying the one or more approximate points for the second sub-range.

Determining the one or more approximate points can include determining an approximate point having a value that is an average of a minimum function value and a maximum function value within the second sub-range.

The web page is a search results web page received from a search engine in response to a query representing the mathematical function.

The range of variable values of the independent variable represents an extent of a display region of the displayed plot of the mathematical function within the graph. The method can further include determining supplementary points of the mathematical function having function values for corresponding values of the independent variable outside the range. User interaction with the graph can then be received, the user interaction corresponding to a request to change the display region of the plot of the mathematical function. The display region of the plot can then be changed to include the supplementary points based on the request.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Particular implementations of the subject matter described herein can be implemented to quickly, efficiently and accurately render a plot of a mathematical function within an interactive graph on a web page, such as a search results web page. The user can enter the mathematical function into a search field on a client device in the same way the user would write the mathematical function or read it in a book. As a result, the user can quickly and conveniently enter and submit the mathematical function to be graphed, in a manner that does not require user knowledge of complex computer software packages or specialized devices such as graphing calculators.

Particular aspects of one or more implementations of the subject matter described in this specification are set forth in the drawings and the description below. Other features, aspects, and advantages of the subject matter will become apparent from the description, the drawings, and the claims.

DETAILED DESCRIPTION

The technology described enhances a user's search experience by providing an interactive graph of a mathematical function within a search results web page. The search results web page is provided by a search engine in response to a user's query representing the mathematical function. The interactive graph provides the user with a rich interactive experience that facilitates and encourages the user's understanding of mathematical concepts and underlying principles.

The user can enter the mathematical function into a search field on a client device in the same way the user would write the mathematical function or read it in a book. As a result, the user can quickly and conveniently enter and submit the mathematical function to be graphed, in a manner that does not require user knowledge of complex computer software packages or specialized devices such as graphing calculators.

One aspect of the technology described includes initially plotting the mathematical function within the interactive graph, without requiring the user to specify an initial display region of the plot. Techniques are described for automatically determining an appropriate initial range and an initial domain which define the initial display region. The initial range and initial domain are based on the identification of points of the mathematical function that may be interesting to the user. This allows a wide variety of mathematical functions to be plotted and appropriately displayed to users who may lack the knowledge to select an appropriate display region that correctly plots the function.

Another aspect of the technology described herein includes quickly, efficiently and accurately rendering a plot of the mathematical function within the interactive graph. Techniques are described for determining a sampling resolution indicating the points of the mathematical function to be plotted within the display region. The sampling resolution includes a higher number of sample points in sections of the mathematical function with function values that change considerably, and includes a lower number of sample points in sections with function values that change slightly.

Environment Overview

Figure 1:
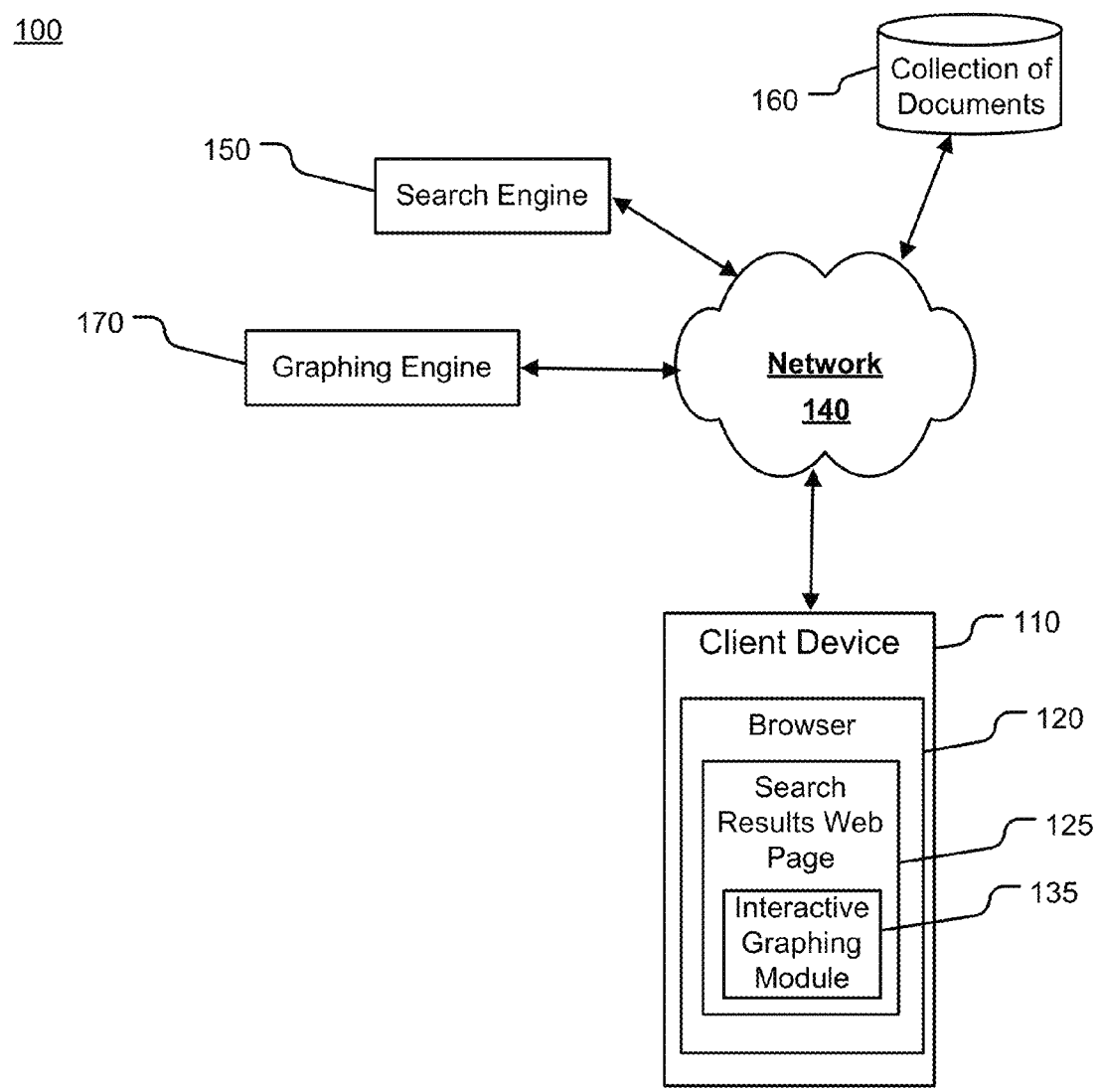
FIG. 1 illustrates a block diagram of an example environment for providing an interactive plot of a mathematical function within a search results web page.

FIG. 1 illustrates a block diagram of an example environment 100 for providing an interactive plot of a mathematical function within a search results web page. As used herein, a web page refers to an electronic document or resource of information that is accessed through a web browser or similar type of application for display on a client device.

The environment 100 includes a client device 110, a search engine 150 and a graphing engine 170. The environment 100 also includes a communication network 140 that allows for communication between the various components in the environment 100.

The client device 110 includes memory for storage of data and software applications, a processor for accessing data and executing applications, input and output devices that allow for user interaction, and components that facilitate communication over the communication network 140. The client device 110 executes an application, such as a web browser 120, having a search field that allows a user to enter a query and submit it to the search engine 150. The query submitted by the user may represent a mathematical function that the user would like to graph.

The search field may be provided within a web page displayed in the browser 120. Alternatively, the search field may be implemented as an add-on to the browser 120, for example as a plug-in or extension to the browser 120. As another example, the search field may be integrated into the browser 120 or other software application executing on the client device 110.

The user may submit the query to the search engine 150 by selecting a search button displayed adjacent to the search field, or entering a carriage return or equivalent character using a keyboard. Alternatively, the browser interface may process user interactions without requiring explicit submission, as the user types. As another example, the user may submit the query by saying a command in a speech interface or pausing for more than a predetermined period of time.

In the examples provided herein, the user's query represents a single mathematical function. However, the techniques described herein can also be utilized to provide an interactive graph of two or more mathematical functions represented within a user's query. For example, a user may enter a query 'plot sin(x) and cos(x)' to request an interactive graph containing both of the functions sin(x) and cos(x) together.

In the examples provided herein, the user's query represents a mathematical function having one independent variable, for example 'x', 't', etc., and one dependent variable, for example 'y'. However, the techniques described herein can also be utilized to provide interactive graphs of mathematical functions having more than one independent variable. In addition, in some implementations the user is not required to include the dependent variable within the query.

In some implementations, the user's query is of the form:
[[plot|graph] [of|for] [var1=] func(var2) [[[when|where] var2 is] from expr1 to expr2]
where 'plot|graph' and 'of|for' are optional plot directives, var1 is the dependent variable in the mathematical function, func( ) is the mathematical function in terms of the independent variable var2, and expr1 and expr2 are constant values for the independent variable var2 that define an optional user specified graph range. In other implementations, the form of the user's query may be different.

The user's query may also include other directives, as well as other terms that enable additional interactive functionality within the graph. For example, a user may enter a query 'plot sin(x) with tangent' to request an interactive graph containing a plot of the function sin(x), together with the tangent of sin(x). As another example, a user may enter a query 'integrate sin(x) from 7 to k' to request an interactive graph of the integral. In some implementations, the user may then move a cursor over a location on the graph to interactively change the value of 'k' and update the plot accordingly.

The mathematical function 'func( )' may include a composition of constants, mathematical functions and mathematical operators such as '=', '/', '*', '^', etc. Examples of the mathematical functions include algebraic functions, and transcendental functions such as trigonometric functions, exponential functions and logarithmic functions.

The search engine 150 receives the user's query from the client device 110. As used herein, the term "search engine" refers to an information retrieval system that returns search results identifying a list of electronic documents relevant to a query. The search engine 150 includes memory for storage of data and software applications, a processor for accessing data and executing applications, and components that facilitate communication over the communication network 140.

The search engine 150 forwards the user's query or a parsed version of the user's query to a graphing engine 170. The graphing engine 170 includes memory for storage of data and software applications, a processor for accessing data and executing applications, and components that facilitate communication over the communication network 140. In the illustrated example, the network 140 is illustrated between the search engine 150 and the graphing engine 170. In some implementations, the graphing engine 170 is within the search engine 150.

The graphing engine 170 parses the user's query into tokens using parsing rules, or uses a parsed version of the user's query. The graphing engine 170 then compares the tokens to a list of token types to determine whether the user's query represents a mathematical function. If the user's query represents a mathematical function, the graphing engine 170 extracts the variables, mathematical expressions, and the optional user specified graph range within the query. In some implementations, the graphing engine 170 translates the mathematical function into an abstract syntax tree (AST).

The graphing engine 170 also selects an initial graph range and an initial graph domain for use in initially plotting the mathematical function within an interactive graph displayed to the user. The initial graph range is the range of coordinate values for the independent variable, for example 'x', that are initially included in the display of the interactive graph. The coordinate values for the independent variable are also referred to herein as variable values.

The initial graph domain is the domain of coordinate values for the dependent variable, for example 'y', that are initially included in the plot. The values of the dependent variable are also referred to herein as the function values for the mathematical function. The initial graph range and the initial graph domain define the initial display region of the plot in the interactive graph.

In the examples provided herein, the interactive graph is displayed in a two-dimensional Cartesian coordinate system, with the independent variable represented on the horizontal, for example 'x', axis and the dependent variable represented on the vertical, for example 'y', axis. Alternatively, the interactive graph may be displayed using other types of coordinate systems.

If the user's query includes a specified graph range, the graphing engine 170 selects the specified graph range as the initial graph range. If the user's query does not include a specified graph range, the graphing engine 170 selects the initial graph range using the techniques described below with reference to FIG. 7.

The graphing engine 170 calculates the function values for the mathematical function within the initial graph range to determine the initial graph domain. In some embodiments, the graphing engine 170 selects the initial graph domain based on a minimum function value and a maximum function value within the initial graph range. For example, the initial graph domain may be from the 15th percentile of the function values within the initial graph range, to the 85th percentile of the function values within the initial graph range. As another example, the $15^{th}$ to $85^{th}$ percentile may be preliminarily selected, and then optionally expanded to include additional transition points (described below) that may lie outside the $15^{th}$ to $85^{th}$ percentile. As yet another example, the $15^{th}$ to $85^{th}$ percentile may be preliminarily selected, and then increased by a predetermined factor if there are asymptotes within the initial graph range.

The graphing engine 170 then generates an interactive graphing module 135 (described below) for the mathematical function. The graphing engine 170 transmits the interactive graphing module 135 to the search engine 150. As described below, the interactive graphing module 135 is inserted into a search results web page 125 produced by the search engine 150. When the search results web page 125 is displayed in a web browser 120 on the client device 110, the web browser 120 executes the interactive graphing module 135.

The interactive graphing module 135 may be implemented in JavaScript or other suitable programming language. The interactive graphing module 135 contains instructions executable to display the interactive graph and provide the interactive functionality described herein. The interactive graphing module 135 includes instructions identifying the mathematical function, and the initial graph range and the initial graph domain for use in initially plotting the mathematical function in the interactive graph.

The search engine 150 receives the interactive graphing module 125 from the graphing engine 170. In addition, the search engine 150 also executes the user's query against a collection of documents 160 to produce search results. The search results identify a list of documents in the collection of documents 160 that are responsive to the user's query. The search engine 150 can use conventional or other techniques to determine which documents in the collection of documents 160 to include in the search results.

The collection of documents 160 may be collectively stored on multiple computers and/or storage devices. A document in the collection of documents 160 may be a web page, a word processing document, a portable document format (PDF) document, or any other type of electronic document. In some implementations, the collection of documents 160 is obtained from the World Wide Web.

In response to the user's query, the search engine 150 generates a search results web page 125 that includes the search results and the interactive graphing module 135. The interactive graphing module 135 may for example appear at the top of the search results web page 125 (sometimes referred to as a "one-box" user interface), separate from the search results. The search engine 150 then transmits the search results web page 125 to the client device 110.

The client device 110 displays the search results web page 125 within an application, such as the web browser 120, executing on the client device 110. The display of the search results web page 125 executes the instructions in the interactive graphing module 135 within the search results web page 125 to display the interactive graph of the mathematical function. In the examples described herein, the user of the client device 110 submits queries and views the resulting search results web page 125 using the web browser 120. Alternatively, the user may submit queries and view the resulting search results web page 125 using a different application executing on the client device 110.

The interactive graphing module 135 generates the display of the interactive graph and updates the graph in response to user interaction. The interactive graphing module 135 may generate the display of the interactive graph using scalable vector graphics (SVG).

The user of the client device 110 can interact with the interactive graph within the search results web page 125 by performing various actions that correspond to requests that the graph be changed. In particular, the user can interact with the interactive graph to request a change in the display region of a plot of the mathematical function within the interactive graph. In response to the user's interaction, the interactive graphing module 135 then updates the display of the interactive graph within the search results web page 125.

The user may interact with the interactive graph using a keyboard, a pointing device such as a mouse, a touchscreen incorporated into the display of the client device, or any other type of user input device for the client device 110.

The interactive graph may include various user interface elements such as buttons, numeric controls, text boxes, check boxes, etc., that provide a user interface that enables the user to interact with the graph to perform various actions. For example, the interactive graph may include buttons for zooming in or out to change a zoom level of the plot. The buttons for zooming may include buttons for zooming in and out on both axes of the plot at the same time. The buttons for zooming may also include buttons for zooming in and out on a single axis of the plot, without changing the zoom level of the other axis. The interactive graph may also include navigational buttons for panning the plot left, right, up and down.

The interactive graph may also provide additional interactive functionality. For example, the user may click and drag the cursor across the graph to pan in a desired direction. The user may also zoom in and out using a mouse wheel or other input device. In some embodiments, the user may also zoom out by moving the cursor over the graph and double-clicking on a mouse button, e.g. a 'right' mouse button.

As another example, the user may place (hover) the cursor over a location on the graph to display a marker at a position on the plot of the mathematical function that depends on the location of the cursor. The graph may also include a box displaying a function value and a variable value that indicate the position of the marker on the plot. The user may then move the cursor across the graph to change the position of the marker on the plot and view an update of the function value and variable value displayed in the text box.

The interactive graph may also enable the user to annotate, print and export the function values and corresponding variable values. For example, the user may place the cursor over the graph and right click on the mouse to display a menu, and select the appropriate option within the menu. The user may also copy the graph into another tab or another application, such as a word processing application, executing on the client device 110 by clicking on the graph and dragging.

The interactive graphing module 135 enables the user to change the display of the interactive graph directly within the search results web page 125, without re-displaying the entire search results web page 125. The interactive graphing module 135 executes directly on the client device 110, without requiring further communication with the graphing engine 170 to update the display of the graph. This allows the plot of the mathematical function to be updated quickly in response to user interaction.

The network 140 facilitates communication between the various components in the environment 100. The network 140 may utilize a combination of dedicated or private communications links and public communication links. In one embodiment, the network 140 uses standard communications technologies, protocols, and/or inter-process communications techniques.

Many other configurations of the environment 100 are possible having more or less components than the environment 100 shown in FIG. 1. For example, the environment 100 can include many more client devices that submit queries to the search engine 150.

Figure 2:
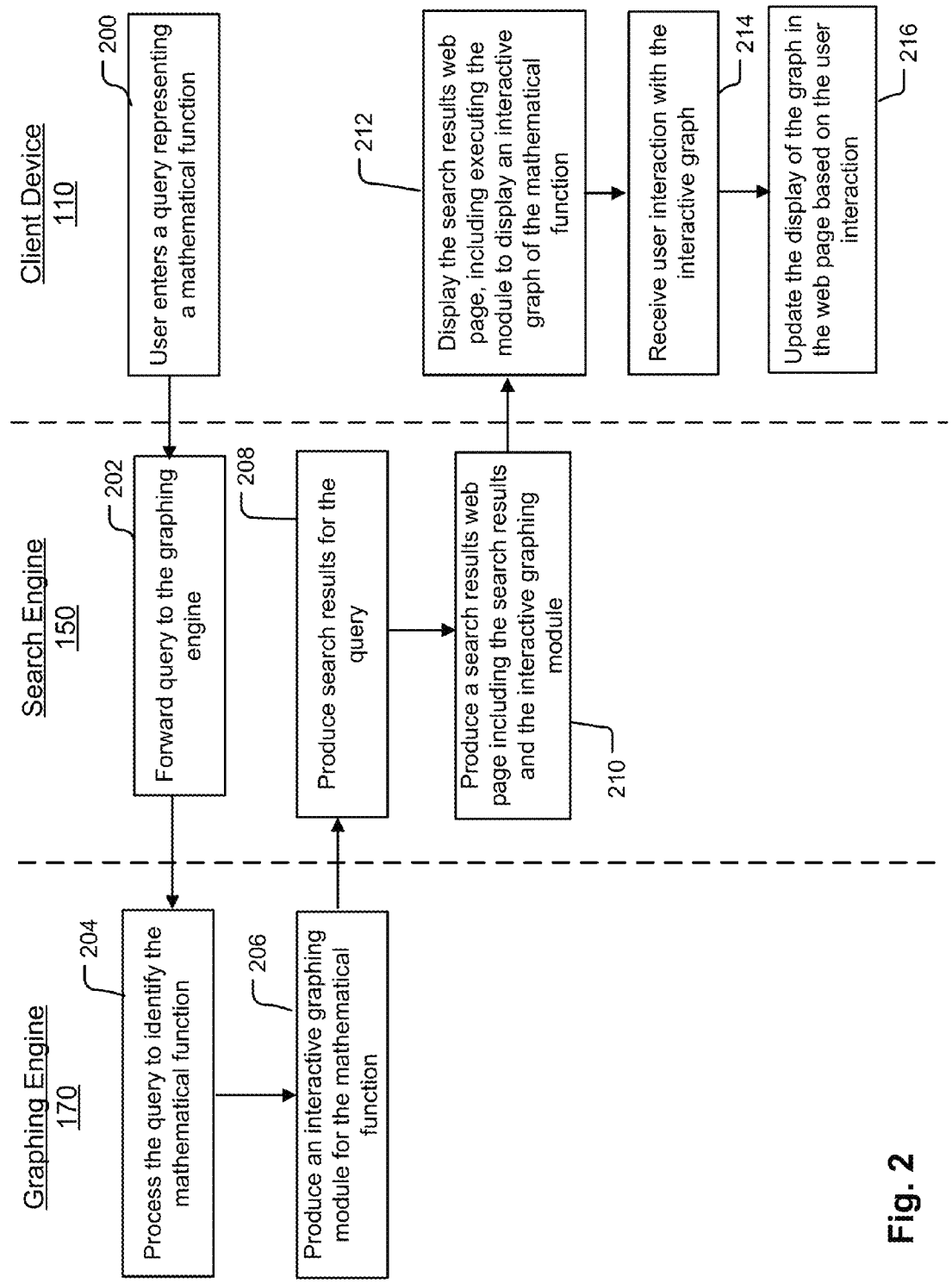
FIG. 2 is a flow chart illustrating an example process for providing an interactive graph within a search results web page.

FIG. 2 is a flow chart illustrating an example process for providing an interactive graph within a search results web page. Other implementations may perform the steps in different orders and/or perform additional or different steps than the ones illustrated in FIG. 2.

At step 200, a user of the client device 110 enters a query representing a mathematical function and submits it to the search engine 150.

At step 202, the search engine 150 forwards the query to the graphing engine 170. At step 204, the graphing engine 170 processes the query to identify the mathematical function.

At step 206, the graphing engine 206 produces an interactive graphing module for the mathematical function. The graphing engine 170 transmits the interactive graphing module to the search engine 150.

At step 208, the search engine 150 produces search results for the user's query. At step 210, the search engine 150 produces a search results web page that includes the search results and the interactive graphing module. The search engine 150 transmits the search results web page to the client device 110.

At step 212, the search results web page is displayed on the client device 110. The display of the search results web page includes executing the interactive graphing module to display an interactive graph of the mathematical function.

At step 214, the client device 110 receives user interaction with the interactive graph. At step 216, the interactive graphing module updates the display of the graph in the search results web page based on the user interaction.

Figure 3:
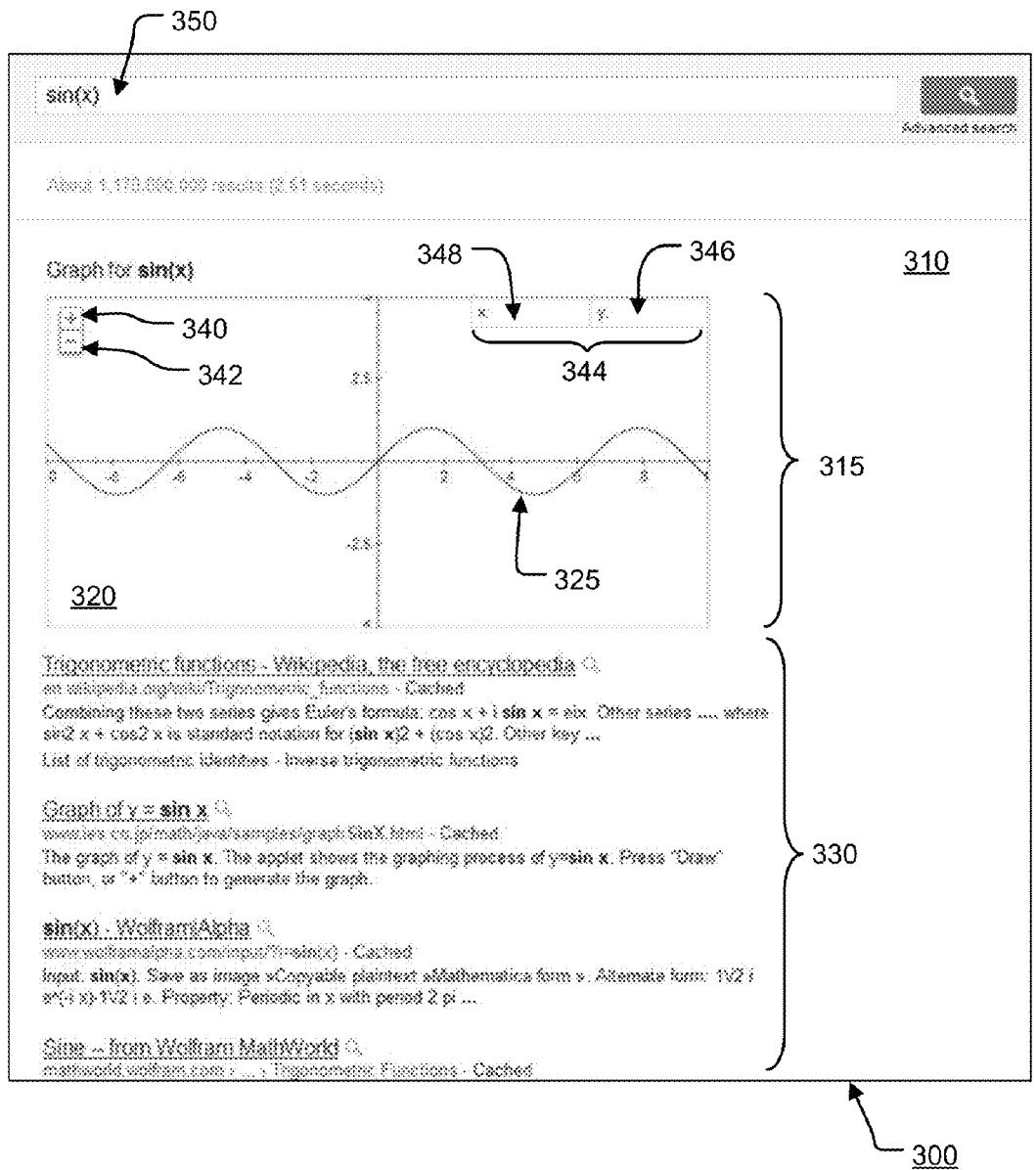
FIG. 3 is an example user interface that can be used to provide an interactive graph of a mathematical function within a search results web page.

FIG. 3 is an example user interface 300 that can be used to provide an interactive graph of a mathematical function within a search results web page. The user interface 300 includes a search results web page 310 that is displayed to a user in response to a query.

The search results web page 310 includes a first portion 315 displaying an interactive graph 320 with a plot 325 of a mathematical function. In this example, the user's query 350 is 'sin(x)'.

The interactive graph 320 includes a button 340 selectable by the user to zoom-in on the plot 325 in the interactive graph 320. The interactive graph 320 also includes a button 342 selectable by the user to zoom-out on the plot 325 in the interactive graph 320.

The user may also place (hover) a cursor over a location on the interactive graph 320 to display a marker at a position on the plot 325 that is based on the location of the cursor. A box 344 displays the function value 346 and the variable value 348 indicating the position of the marker. The user may move the cursor to change the position of the marker on the plot and update the corresponding values 346, 348 in the box 344.

The interactive graph 320 may also include additional buttons that are selectable to provide additional user interaction functionality. For example, the interactive graph 320 may include buttons to zoom in and zoom out on the x-axis of the plot, without changing the zoom level of the y-axis. The interactive graph 320 may also include buttons to zoom in and zoom out on the y-axis of the plot, without changing the zoom level of the x-axis. The user may also request to change a zoom level of a single axis of the plot by right clicking on the graph to display a menu, and selecting the appropriate option within the menu.

The interactive graph 320 may also include a button to return to the initial display region of the plot, a share button for sharing the plot with classmates or other users through social networking, and buttons to move the position of the marker to a next 'interesting point' in the plot 325, such as the next root, a minimum point, an inflection point, etc.

In some embodiments, the user may also share the graph 320 by clicking on the graph 320 and dragging to an appropriate location within a social networking menu bar embedded within the browser 120. In some embodiments, the user may also copy the graph into another application, such as a word processing application, executing on the client device by clicking on the graph and dragging into the other application.

The search results web page 310 also includes a second portion 330 displaying search results for the user's query. The search results include links to a list of documents that are responsive to the user's query.

Figure 4A:
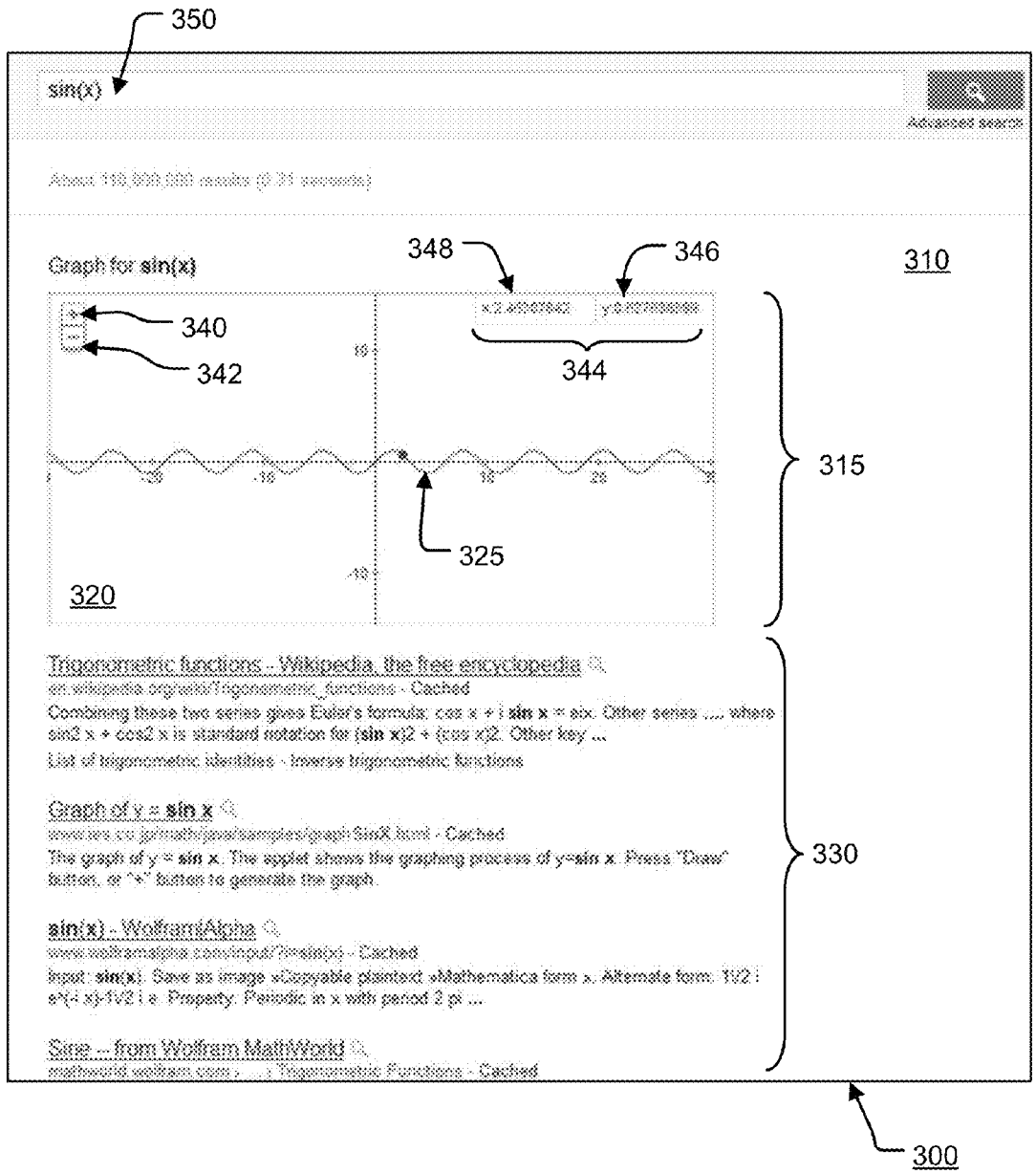
FIG. 4A-4C are examples of the user interface in FIG. 3 after user interaction with the interactive graph.

FIG. 4A is an example of the user interface 300 in FIG. 3 after user interaction with the interactive graph 320. In this example, the user interaction corresponds to zooming-out on both axes of the plot 325 by clicking on the button 342. As shown in FIG. 4A, the display of the interactive graph 320 has been updated based on the user interaction, without re-displaying the entire search results web page 310

Figure 4B:
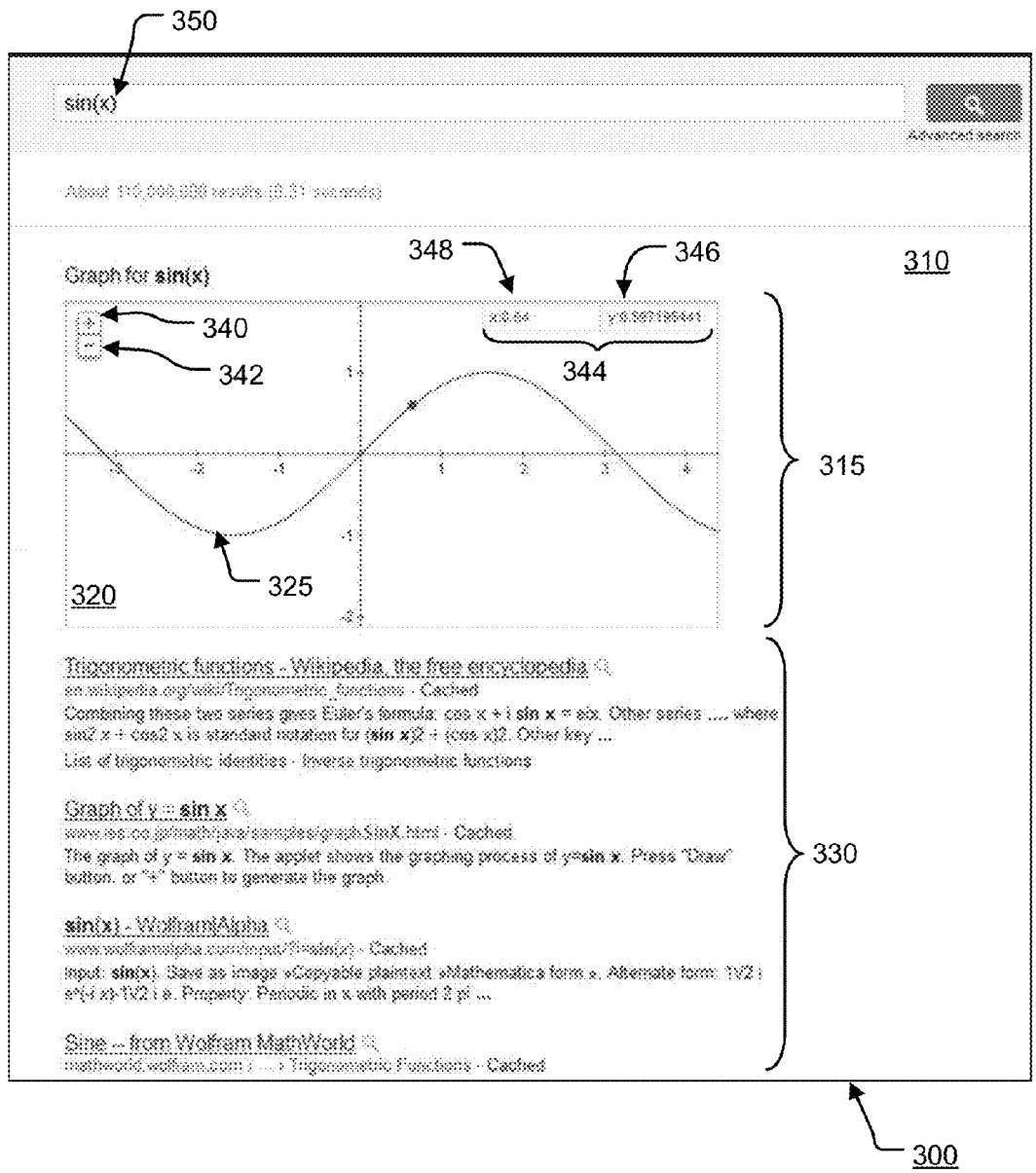

FIG. 4B is an example of the user interface 300 in FIG. 3 after user interaction with the interactive graph 320. In this example, the user interaction corresponds to zooming-in on both axes of the plot 325 by clicking on the button 340.

Figure 4C:
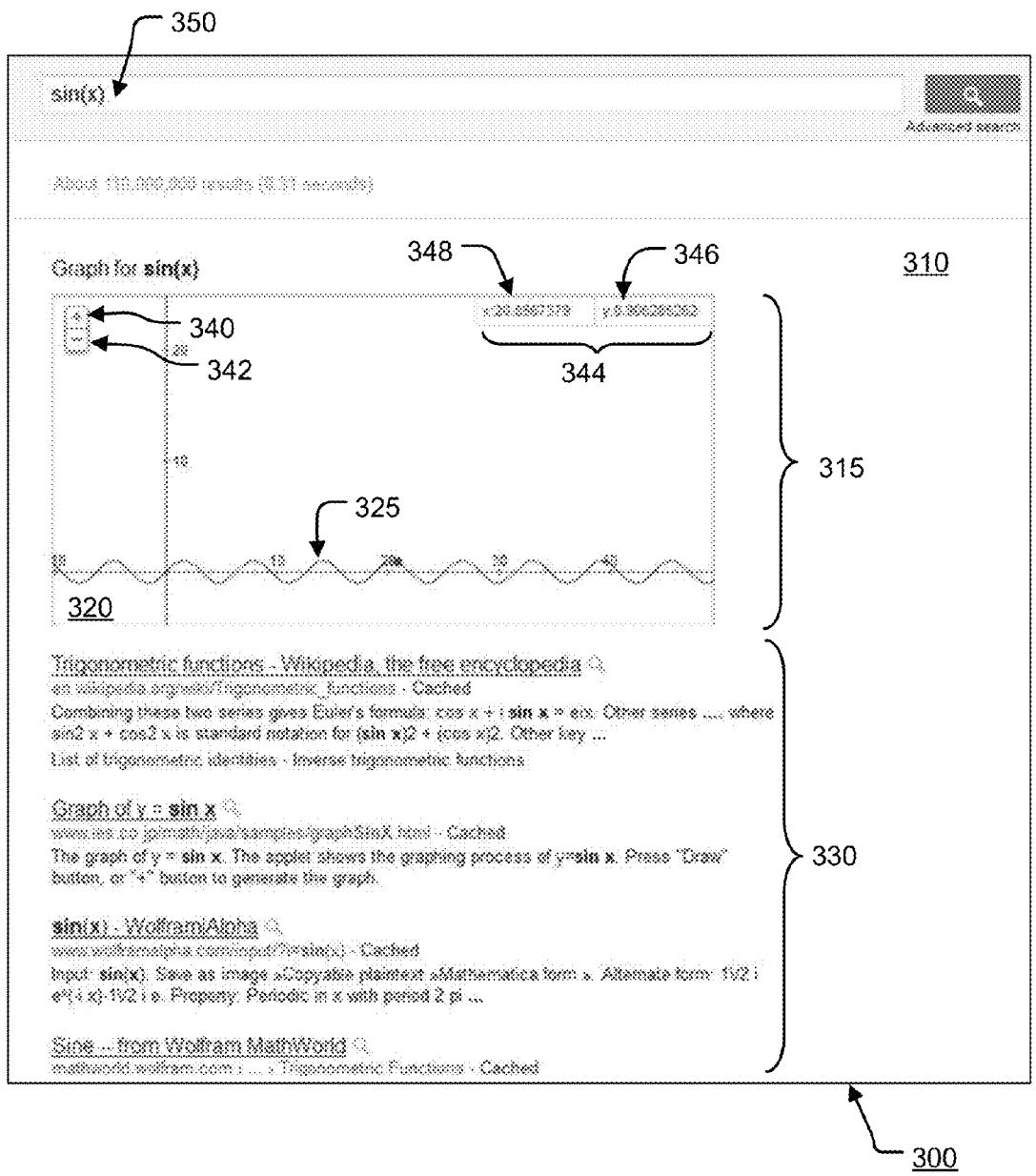

FIG. 4C is an example of the user interface 300 in FIG. 3 after user interaction with the interactive graph 320. In the example, the user interaction corresponds to zooming-out on both axes of the plot 325 by clicking on the button 340, followed by panning the plot 325 to the right by clicking and dragging a cursor across the graph 320.

Example Computer System

Figure 5:
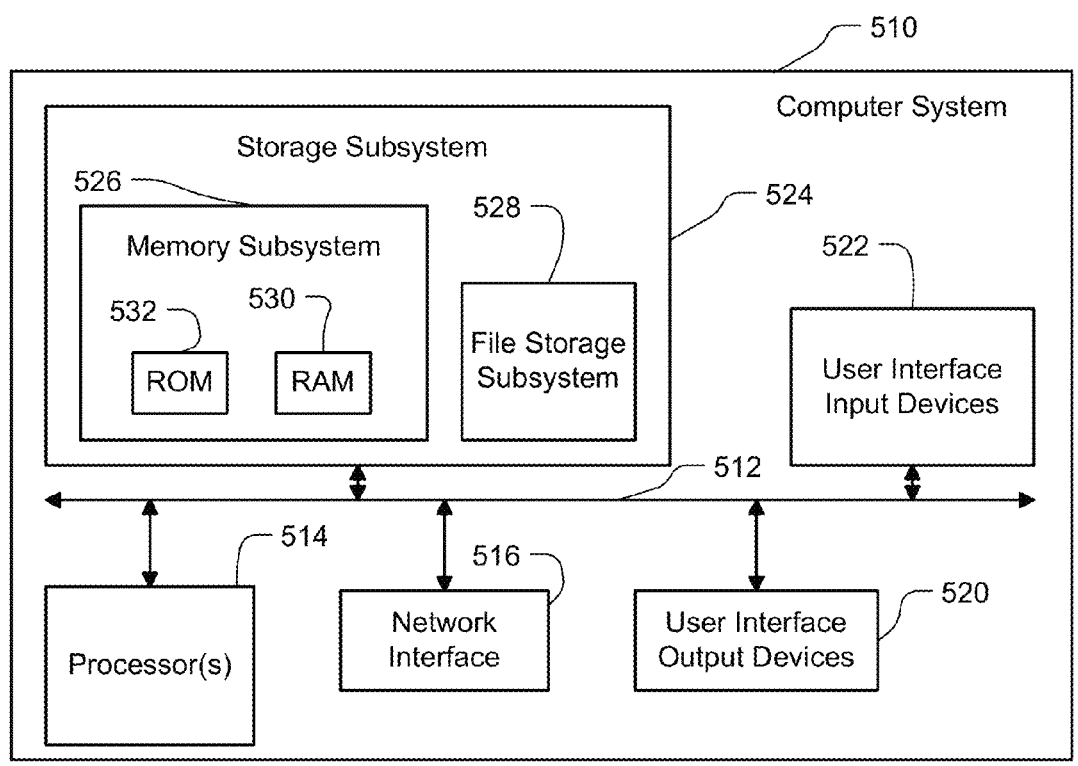
FIG. 5 is a block diagram of an example computer system.

FIG. 5 is a block diagram of an example computer system. Computer system 510 typically includes at least one processor 514 which communicates with a number of peripheral devices via bus subsystem 512. These peripheral devices may include a storage subsystem 524, including for example memory devices and a file storage subsystem, user interface input devices 522, user interface output devices 520, and a network interface subsystem 516. The input and output devices allow user interaction with computer system 510. Network interface subsystem 516 provides an interface to outside networks, including an interface to communication network 140, and is coupled via communication network 140 to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include possible types of devices and ways to input information into computer system 510.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein, including the logic to carry out the processes described herein. These software modules are generally executed by processor 514 alone or in combination with other processors.

Memory 526 used in the storage subsystem can include a number of memories including a main random access memory (RAM) 530 for storage of instructions and data during program execution and a read only memory (ROM) 532 in which fixed instructions are stored. A file storage subsystem 528 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem in the storage subsystem 524, or in other machines accessible by the processor.

Bus subsystem 512 provides a mechanism for letting the various components and subsystems of computer system 510 communicate with each other as intended. Although bus subsystem 512 is shown schematically as a single bus, alternative embodiments of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating the preferred embodiments. Many other configurations of computer system 510 are possible having more or less components than the computer system depicted in FIG. 5.

Graphing Engine

Figure 6:
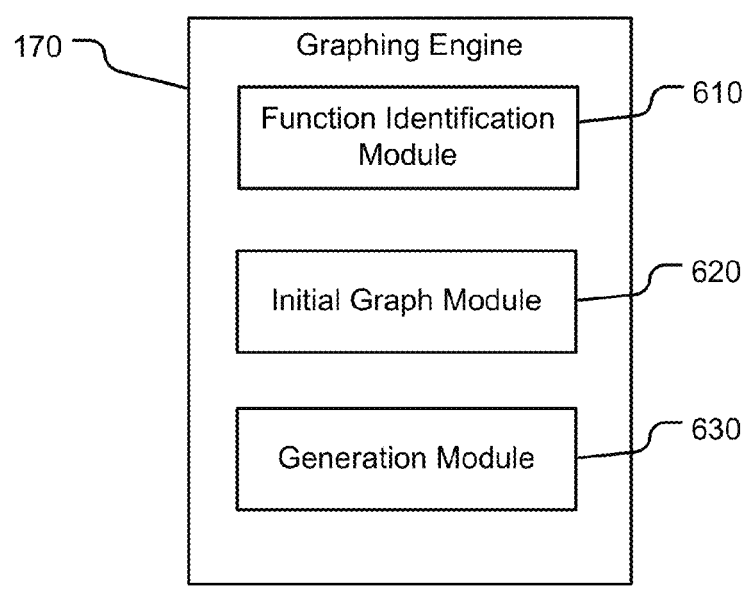
FIG. 6 is a block diagram illustrating example modules within the graphing engine.

FIG. 6 is a block diagram illustrating example modules within the graphing engine 170. In FIG. 6, the graphing engine 170 includes a function identification module 610, an initial graph module 620, and a generation module 630. Some implementations may have different and/or additional modules than those shown in FIG. 6. Moreover, the functionalities can be distributed among the modules in a different manner than described herein.

The function identification module 610 parses the user's query into tokens using parsing rules. The function identification module 610 then compares the tokens to a list of token types to determine whether the user's query represents a mathematical function. If the user's query represents a mathematical function, the function identification module 610 extracts the variables, mathematical expressions, and the optional user specified graph range. The function identification module 610 provides data indicating the mathematical function to the generation module 630 (described below). In some embodiments, the function identification module 610 translates the mathematical function into an AST for use in producing the interactive graphing module.

The initial graph module 620 selects the initial graph range and the initial graph domain for use in initially plotting the mathematical function in the interactive graph displayed to the user. If the user's query includes a specified graph range, the initial graph module 620 selects the specified graph range as the initial graph range. If the user's query does not include a specified graph range, the initial graph module 620 identifies transition points of the mathematical function in order to select the initial graph range.

A transition point is a point on a plot of the mathematical function having characteristics that match certain criteria. The criteria enables the identification of points of the mathematical function that may be interesting to the user, and thus potentially should be included in the initial display of the graph. The identification of transition points and the selection of the initial graph range are described in more detail below with reference to FIGS. 7-9.

The initial graph module 620 calculates the function values for the mathematical function within the initial graph range to select the initial graph domain. The initial graph module 620 provides the initial graph range and the initial graph domain to the generation module 630.

The generation module 630 then produces the interactive graphing module. The interactive graphing module contains instructions executable to display the interactive graph and provide the interactive functionality described herein. The interactive graphing module includes instructions identifying the mathematical function, and the initial graph range and the initial graph domain for use in initially plotting the mathematical function in the interactive graph.

Figure 7:
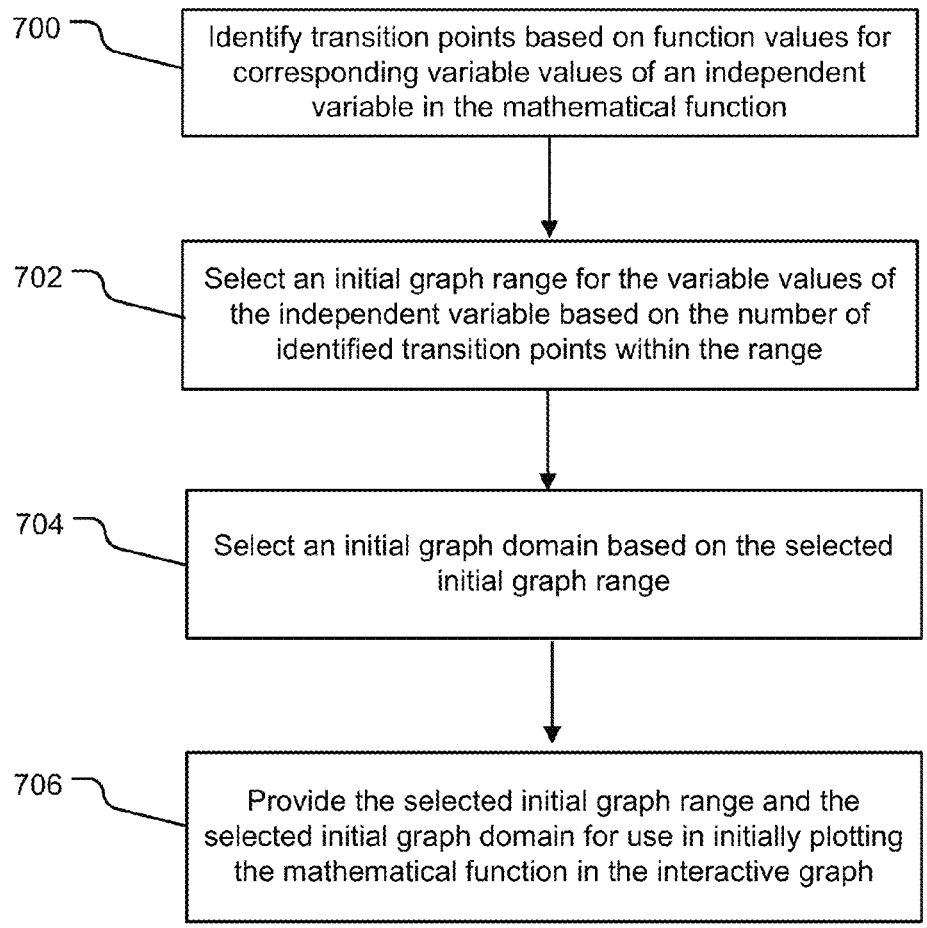
FIG. 7 is a flow chart of an example process for selecting an initial graph range and an initial graph domain.

FIG. 7 is a flow chart of an example process for selecting an initial graph range and an initial graph domain. Other implementations may perform the steps in different orders and/or perform different or additional steps than the ones illustrated in FIG. 7. For convenience, FIG. 7 will be described with reference to one or more computers that perform the process. The system can be for example, the initial graph module 620 described above with reference to FIG. 6.

At step 700, the system identifies transition points based on function values for corresponding variable values of an independent variable in the mathematical function. The characteristics of the function values of the mathematical function used to determine whether a point is a transition point can vary from implementation to implementation. The characteristics may also depend on the function type of the mathematical function. For example, different characteristics may be used if the mathematical function is a polynomial than if the mathematical function is a trigonometric function.

In some implementations, the transition points include one or more of the points where the function value is zero, where the first derivative of the mathematical function is zero, an inflection point where the second derivative of the mathematical function is zero, or where the second derivative or higher derivative exceeds a predefined value. The transition points may also include points where the mathematical function has a vertical asymptote. The transition points may also include points that are adjacent to points having undefined function values. The transition points may also include points where the derivative is a minimum, or where the derivative is a maximum. The transition points may also include global-regional minimums and maximums, where a predetermined number of minimums and maximums are selected within a range of values for the independent variable. The transition points may also include global-regional minimum and maximum derivatives. The transition points may also include points where the curvature is maximum and minimum. The identification of transition points is described in more detail below with reference to FIG. 9.

At step 702, the system selects an initial graph range for the variable values of the independent variable based on the number of identified transition points within the range. The initial graph range may for example be selected to include all of the identified transition points. In some alternatives, the initial graph range includes a number of identified transition points between a minimum threshold number and a maximum threshold number. As another example, the initial graph range may be selected to include less than a threshold number of certain types of transition points. For example, the initial graph range may be chosen so that the number of minima points within the range is less than a predetermined number, the number of maxima points within the range is less than the predetermined number, the number of asymptotes within the range is less than the predetermined number, etc. These transition points may be those that are closest to the origin.

If the system does not identify any transition points, the system can calculate function values of the mathematical function for overlapping ranges for the independent variable to select the initial graph range. In some implementations, each of the overlapping ranges are $[-10^K, 10^K]$ for the independent variable, where K is a different value for each overlapping range. The number of variable values within each overlapping range and the number of overlapping ranges can vary from implementation to implementation. In some embodiments, the number of variable values within each overlapping range is 1000 points that are chosen randomly.

Each overlapping range may for example be scored based on the percentage of points that have defined function values. The score may be weighted based on the extent of the corresponding range. The highest scoring overlapping range may then be selected as the initial graph range.

At step 704, the system selects an initial graph domain based on the selected initial graph range. The initial graph domain may for example be based on a minimum function value and a maximum function value within the initial graph range. For example, the initial graph domain may be from the 15th percentile of the function values within the initial graph range, to the 85th percentile of the function values within the initial graph range. As another example, the $15^{th}$ to $85^{th}$ percentile may be preliminarily selected, and then optionally expanded to include additional transition points (described below) that may lie outside the $15^{th}$ to $85^{th}$ percentile. As yet another example, the $15^{th}$ to $85^{th}$ percentile may be preliminarily selected, and then increased by a predetermined factor if there are asymptotes within the initial graph range.

At step 706, the system provides the selected initial graph range and the selected initial graph domain for use in initially plotting the mathematical function in the interactive graph displayed to the user. In this example, the selected initial graph range and the selected initial graph domain are provided to the generation module 630. The generation module 630 then includes instructions in the interactive graphing module 315 to initially plot the mathematical function with the initial graph range and the initial graph domain.

To aid in the understanding of certain processes described herein, an example for scoring and selecting the highest scoring overlapping range is provided below. In this example, the mathematical function is y=sqrt(sin(abs(x)^0.5))*x.

Figure 8A:
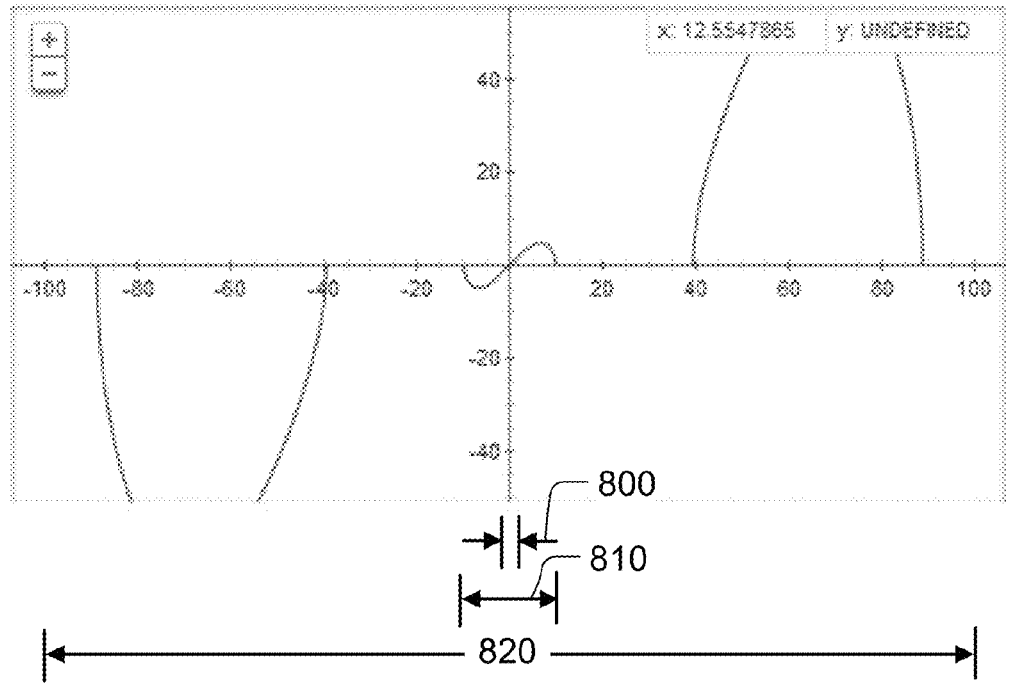
FIGS. 8A and 8B illustrate an example of overlapping ranges for a plot of a mathematical function.
Figure 8B:
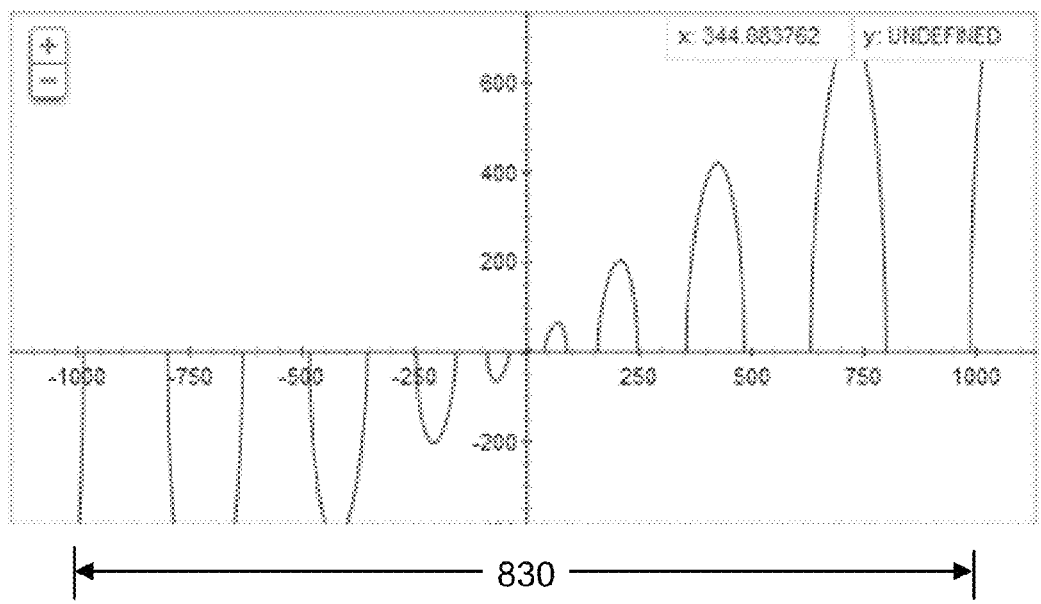

In this example, there are four overlapping ranges for the independent variable 'x'. A first overlapping range 800 is [−1, 1], a second overlapping range 810 is [−10, 10], a third overlapping 820 range is [−100, 100] and a fourth overlapping range 830 [−1000, 1000]. FIG. 8A is a plot showing the function over the ranges 800, 810, 820. FIG. 8B is a zoomed out view of the plot in FIG. 8A to show the function over the range 830.

In this example, the score for a given overlapping range is calculated as the fraction of the points in the range that have defined function values, multiplied by a predetermined weighting factor for the range. In this example, the weighting factors for the various overlapping ranges are given by the following weighting table:

| Overlapping Range | Weighting Factor |
| --- | --- |
| [−1, 1] | 1.5 |
| [−10, 10] | 2.0 |
| [−100, 100] | 1.0 |
| [−1000, 1000] | 1.0 |

The function in this example is defined everywhere within the range 800. As a result, the fraction of defined function value points for the range 800 is 1. In contrast, the function is defined over approximately 57.5% of the range 820. As a result, the fraction of defined function value points for the range 820 is 0.575. The fraction of the defined function value points for the other ranges 810, 830 can be determined in a similar manner. The fraction of the defined function value points in each overlapping range for this example are summarized in the following table:

| Overlapping Range | Fraction of Defined Function Value Points |
| --- | --- |
| [−1, 1] | 1.0 |
| [−10, 10] | 0.988 |
| [−100, 100] | 0.575 |
| [−1000, 1000] | 0.458 |

The scores for each of the overlapping ranges is then given by the following table:

| Overlapping Range | Score |
| --- | --- |
| [−1, 1] | 1.5 |
| [−10, 10] | 1.976 |
| [−100, 100] | 0.575 |
| [−1000, 1000] | 0.458 |

Thus, in this example, the range 810 is the highest scoring overlapping range. As a result, the range 810 will be selected as the initial graph range for use in plotting the mathematical function mathematical function is y=sqrt(sin(abs(x)^0.5))*x.

Figure 9:
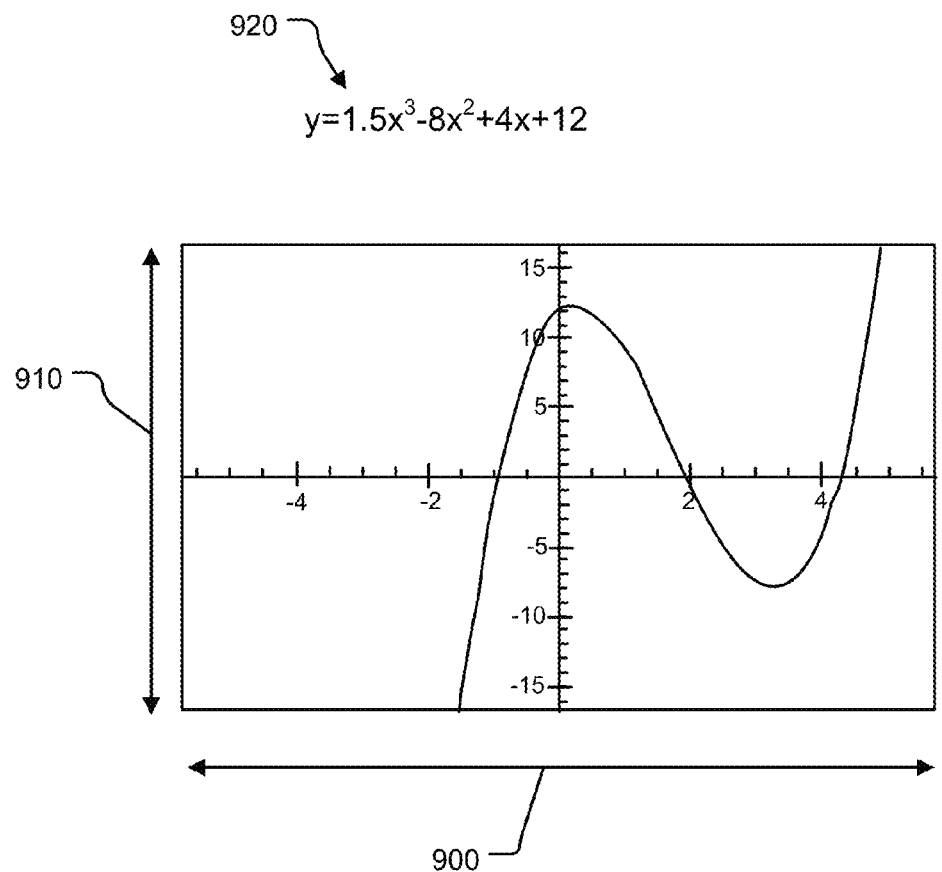
FIG. 9 illustrates an example of a selected initial graph range and a selected initial graph domain for use in initially plotting an example mathematical function.

FIG. 9 illustrates an example of a selected initial graph range 900 and a selected initial graph domain 910 for use in initially plotting an example mathematical function 920. In this example, the mathematical function 920 is y=1.5x^3−8x^2+4x+12. In this example, the selected initial graph range 900 is from −5.69344 to 5.69344, and the selected interval graph domain is from −16.7018 to 16.7018.

Figure 10:
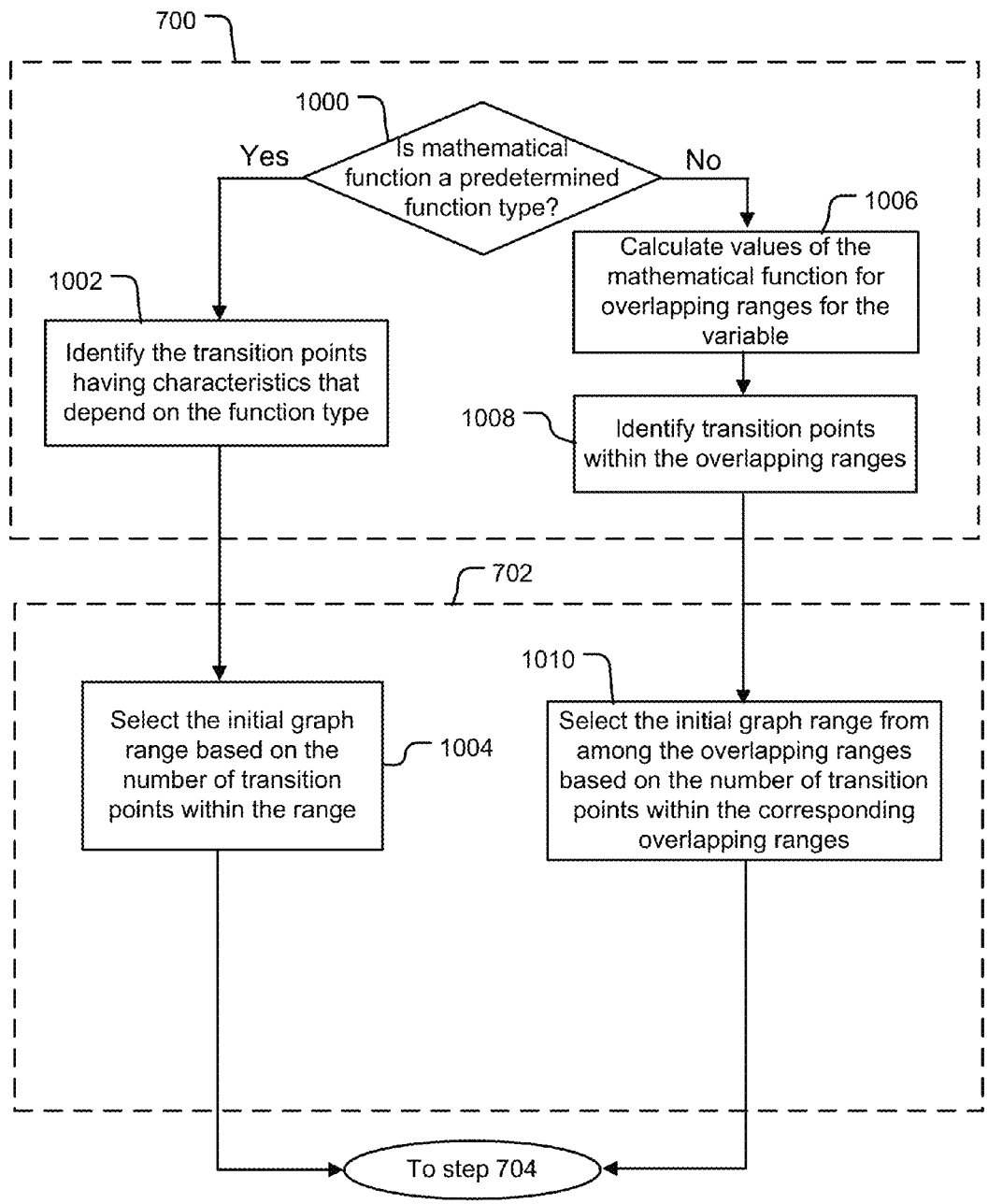
FIG. 10 illustrates an example process for the steps in the flow chart of FIG. 7 of identifying transition points and selecting an initial graph range.

FIG. 10 illustrates an example process for the steps 700, 702 in the flow chart of FIG. 7 of identifying transition points and selecting an initial graph range. Other implantations may perform the steps in different orders and/or perform different or additional steps than the ones illustrated in FIG. 10. For convenience, FIG. 10 will be described with reference to one or more computers that perform the process. The system can be for example, the initial graph module 620 described above with reference to FIG. 6.

At step 1000, the system determines whether the mathematical function is a predetermined function type. Examples of predetermined function types may include polynomials, rational functions and trigonometric functions.

If the mathematical function is a predetermined function type, the process continues to step 1002. At step 1002, the system identifies transition points having characteristics that depend on the function type. In particular, the system identifies transition points that match criteria that depends on the function type.

For example, if the mathematical function is a polynomial, the transition points identified by the system may include roots, minima, maxima and inflection points. If the mathematical function is a rational function, the transition points identified by the system may include minima, maxima, inflection points, zeros and poles. If the mathematical function includes a trigonometric function such as sin(ax−b), cos(ax−b) tan(2ax−2b) or cot(2ax−2b), the transition points may include points corresponding to values of the variable which are multiples of π*b/2a.

At step 1004, the system selects the initial graph range based on the number of transition points within the range. The system may select the initial graph range using the techniques described above with reference to step 702 in FIG. 7. The process then continues to step 704.

Returning to step 1000, if the mathematical function is not a predetermined function type, the process continues to step 1006. At step 1006, the system calculates values of the mathematical function for overlapping ranges for the variable.

In some implementations, each of the overlapping ranges are from [−10^K, 10^K] for the independent variable, where K is a different value for each overlapping range. The number of values within each overlapping range and the number of overlapping ranges can vary from implementation to implementation. In some embodiments, the number of values within each overlapping range is 1000. The number of overlapping ranges may be for example 10, with K equal to −2, 0, 1, 2, 3, 4, 5, 6, 7 and 9. For example, the overlapping range for k=0 is from [−1, 1] for the independent variable, and the overlapping range for k=1 is from [−10, 10].

At step 1008, the system identifies transition points within the overlapping ranges. In some implementations, the transition locations are identified by numerically approximating the roots, minima and maxima that occur within each overlapping interval.

At step 1010, the system selects the initial graph range from among the overlapping ranges based on the number of transition points within the overlapping ranges. Each overlapping range may for example be scored based on the number of transition points that occur within it. The score may be weighed based on the corresponding values of the variable at the transition points. The highest scoring overlapping range may then be selected as the initial graph range.

The process then continues to step 704 in FIG. 7.

Interactive Graphing Module

Figure 11:
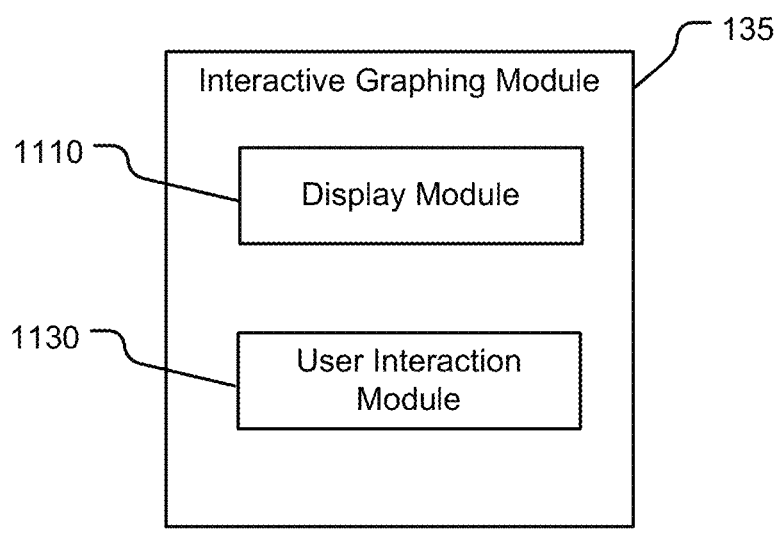
FIG. 11 is a block diagram illustrating example modules within the interactive graphing module.

FIG. 11 is a block diagram illustrating example modules within the interactive graphing module 135. In FIG. 11, the interactive graphing module 135 includes a display module 1110 and a user interaction module 1130. Some implementations may have different and/or additional modules than those shown in FIG. 11. Moreover, the functionalities can be distributed among the modules in a different manner than described herein.

The display module 1110 generates the display of the interactive graph and updates the graph in response to user interaction. The interactive graphing module 135 may generate the display of the interactive graph using scalable vector graphics (SVG). As described in more detail below, the display module 1110 performs calculations and selects points for use in plotting the mathematical function.

The display module 1110 determines a sampling resolution indicating the points of the mathematical function to be plotted within a visible frame of the interactive graph. The visible frame is the portion of the plot in the display region of the interactive graph viewable to the user. As described in more detail below, the sampling resolution for the visible frame is obtained by increasing the number of sample points where the function value rapidly changes. The sampling of the visible frame is described in more detail below with reference to FIG. 12.

The display module 1110 also calculates a sampling resolution of supplementary points of the mathematical function in external frames. The external frames are sections of the plot adjacent to the visible frame, and not currently viewable to the user. In some embodiments, the sampling resolution of external frames is performed by uniformly sampling the function for corresponding variable values of the variable outside the visible frame.

The supplementary points can then be used to quickly update the plot in response to user interaction with the graph. Upon receiving user interaction corresponding to a request to change the display region of the plot, the display module 1110 can change the plot to include supplementary points that have already been identified. For example, when the user clicks and drags the cursor across the graph to pan in a desired direction, the display module 1110 uses the supplementary points of a previously external frame as updated points plotted in the graph. Once the user releases the mouse button, the display module 1110 may calculate a new sampling resolution for the visible frame and re-plot the function using the new sampling resolution.

The display module 1110 also determines the positions of the major and minor ticks to be displayed on the vertical axis and the horizontal axis of the graph. The major ticks are the ticks on an axis that are shown with displayed axis values. The minor ticks are the ticks on an axis that are shown without displayed axis values. The techniques for determining the positions of the major ticks and minor ticks can vary from implementation to implementation.

In some implementations, the display module 1110 determines the positions of the minor ticks within the visible frame by calculating the minimum number of equally spaced minor ticks that are greater than a predefined minimum. The predefined minimum may for example be based on the number of pixels in the interactive graph in the direction of the axis.

In some implementations, the spacing between adjacent minor ticks may for example be expressed mathematically as 1*base*10^k or 5*base*10^k, where 'k' is an integer value and 'base' is a constant. The value of 'base' may for example be an integer value such as 1. The value of 'base' may also depend on the mathematical function type. For example, if the mathematical function is a trigonometric function, the 'base' may be π.

The display module 1110 may then select some of the minor ticks to be major ticks. The display module 1110 may calculate a score for each of the minor ticks to determine which minor ticks to select. The score of a given minor tick may for example be based on its corresponding axis value. For example, the score may be based on the number of minor ticks between the given minor tick and a predefined axis value such as zero.

In some implementations, the score may be based on which digits appear within the fractional part of the corresponding axis value. When written in decimal notation, the fractional part corresponds to the digits appearing to the right of the decimal point. For example, the score may be based on the number of times the digit '0' appears within a predefined number of digits to the right of the decimal point of the corresponding axis value. The score may also be based on whether the first non-zero digit to the right of the decimal point is a '5'.

The display module 1110 may then score sets of equally spaced minor ticks based on the individual scores of the minor ticks in the corresponding set. The minor ticks within the highest set score may then be selected as the major ticks for the axis. In some implementations, the set score for a given set is based on a summation of the individual scores of the minor ticks in the given set. The set score may also be based on the difference between the highest axis value and the lowest axis value in the given set.

The user interaction module 1130 receives user input corresponding to interaction with the interactive graph. The user interaction module 1130 processes the user input to produce user interaction data indicating the user's request to change the display of the graph. The user interaction module 1130 provides the user interaction data to the display module 1110, so that the display of the graph can be changed accordingly.

Figure 12:
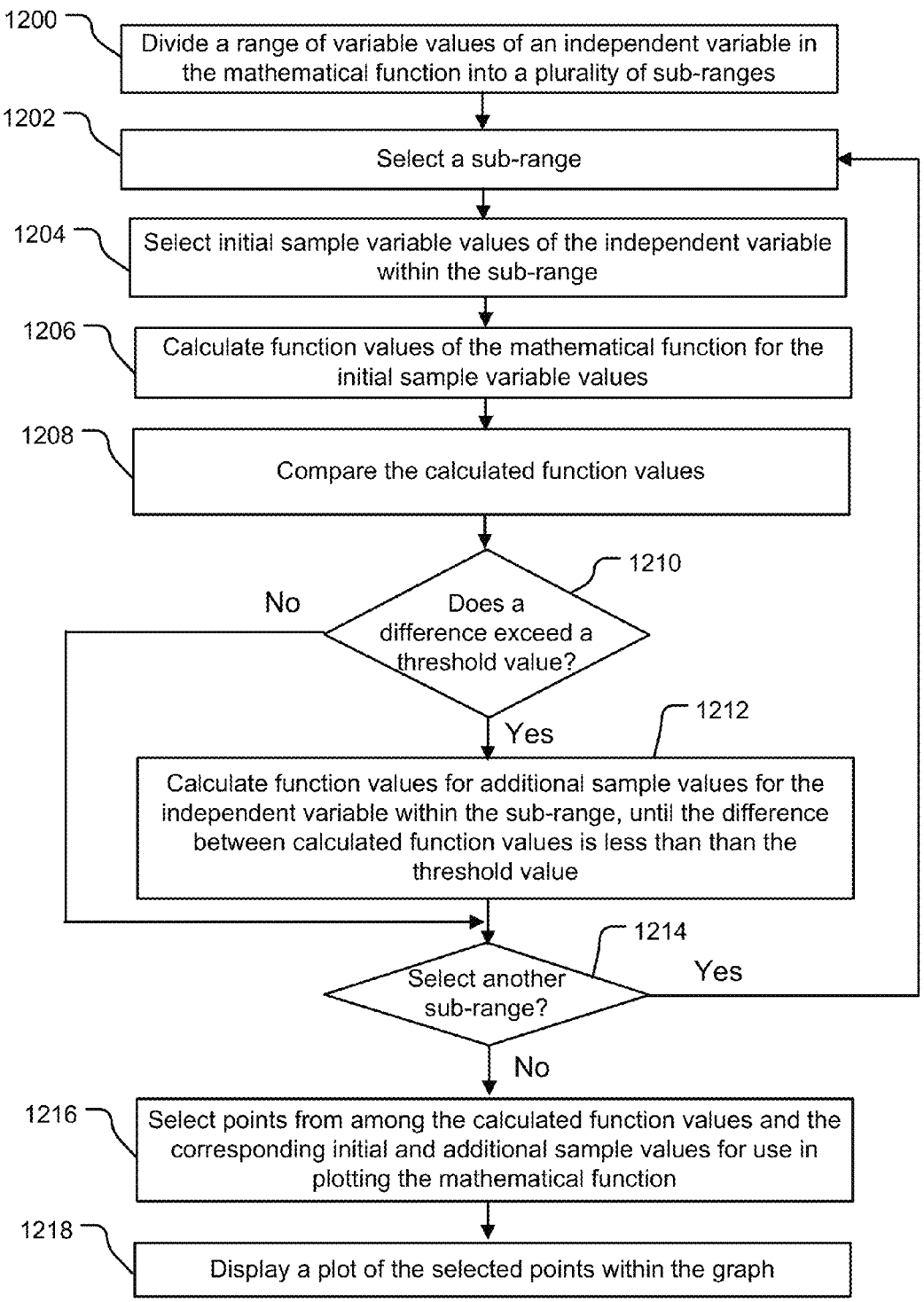
FIG. 12 is a flow chart of an example process that determines the sampling of the mathematical function for display within the search results web page.

FIG. 12 is a flow chart of an example process that determines the sampling of the mathematical function for display within the search results web page. Other implantations may perform the steps in different orders and/or perform different or additional steps than the ones illustrated in FIG. 12. For convenience, FIG. 12 will be described with reference to one or more computers that performs the process. The system can be for example, the display module 1110 described above with reference to FIG. 11.

At step 1200, the system divides a range of variable values of an independent variable in the mathematical function into a plurality of sub-ranges. In this example, this range of variable values of the independent variable represents an extent of the visible frame of the plot within the graph. The number of sub-ranges may for example be dependent on the number of pixels in the interactive graph.

At step 1202, the system selects a sub-range of the plurality of sub-ranges. At step 1204, the system selects initial sample variable values of the independent variable within the selected sub-range. In some implementations, the initial sample variable values within the selected sub-range may be selected randomly. The number of initial sample variable values within the sub-range may be for example 10.

At step 1206, the system calculates function values of the mathematical function for the initial sample variable values of the independent variable within the selected sub-range.

At step 1208, the system compares the calculated function values within the selected sub-range. At step 1210, the system determines whether a difference between the calculated function values exceeds a threshold value.

If the difference between the calculated function values exceeds the threshold value, the process continues to step 1212. At step 1212, the system iteratively calculates function values for additional sample variable values for the independent variable within the selected sub-range, until the difference between calculated function values is less than the threshold value. If the difference at step 1210 is less than the threshold value, the process skips step 1212.

The techniques for comparing the function values within the selected sub-range in step 1208, and adding additional sample variable values in step 1212 can vary from implementation to implementation.

In some implementations, comparing the function values within the selected sub-range may include comparing function values for successive initial sample variable values. Pairs of initial sample variable values can then be identified that have a difference between corresponding calculated function values that exceed the threshold value. Additional sample variable values can then be added between the initial sample variable values in the identified pairs.

Comparing the function values can include identifying a minimum function value and a maximum function value within a particular sub-range. Additional sample variable values can then be added if the difference between the minimum function value and the maximum function value exceeds the threshold value.

Comparing the function values can include comparing the derivatives of the function values within a particular sub-range. For example, additional sample variable values may be added if one of the derivatives has a sign opposite that of the remaining derivatives in the particular sub-range. In other words, if one of the derivatives has one of a positive and negative value, and the remaining derivatives have the other of the positive and negative value. This may for example indicate the presence of an asymptote within the particular sub-range.

Comparing the function values can also include identifying initial sample variable values having undefined function values. Additional sample variable values may then be added between an initial sample variable value having an undefined function value, and an adjacent initial sample variable value that has a real value. The additional sample variable value that is adjacent to an initial sample variable value having an undefined function value may be determined for example using a binary search algorithm.

At step 1214, the system determines whether there are additional sub-ranges that need to be sampled. If so, the process returns to step 1202 where another sub-range is selected and subsequently sampled. Once all of the sub-ranges have been sampled, the process continues to step 1216.

At step 1216, the system selects points for use in plotting the mathematical function. The points are selected from among the calculated function values and the corresponding initial and additional sample variable values within the sub-ranges. In some implementations, the system may select all of the calculated function values for the corresponding sample variable values within the sub-ranges to which additional sample points have been added.

The system also rejects points from use in plotting the mathematical function that have function values that are undefined. The rejected points are flagged so that no point is displayed for the rejected points, and a new line of the plot is started at the next function value that is defined.

The system may also determine one or more approximate points for use in plotting points within sub-ranges that have function values that differ by less than a second threshold value. The second threshold value may for example be based on the number of pixels that each sub-range spans. In doing so, the number of points that are plotted can be reduced for sub-ranges having function values that change very little. For example, an approximate point within a sub-range may have a value that is an average of a minimum function value and a maximum function value within that sub-range.

At step 1218, the system displays a plot of the selected points within the graph. The points may for example be plotted using piecewise linear rendering to form the plot of the mathematical function. In piecewise linear rendering, each adjacent pair of function values determine line segment, and the collection of line segments forms the plot.

To aid in the understanding of certain processes described herein, an example for adding additional sample value points to sub-ranges are provided below. In this example, the mathematical function is $y=\text{sqrt}(\sin(x)+\tan(x))$. A range from [−10, 10] for the independent variable 'x' is divided into 1500 sub-ranges.

One sub-range of 'x' for this example is from [7.85333, 7.85466]. The initial sample variable values, corresponding function values and derivative values for this sub-range are summarized in the following table:

| Initial Sample Variable Values | Function Values | Derivative Values |
|---|---|---|
| 7.853618751 | 2756.710364 | |
| 7.854869189 | −1125.690266 | 3104832.57 |
| 7.85690801 | −340.7186318 | −385012.53 |
| 7.857436374 | −288.4562469 | −98913.60 |
| 7.859850555 | −169.3871116 | −49320.72 |
| 7.860760094 | −146.5238762 | −25137.17 |
| 7.861812622 | −126.6952164 | −18839.08 |
| 7.863160438 | −107.943616 | −13912.58 |
| 7.864459246 | −94.43813168 | −10398.37 |
| 7.86571958 | −84.18990374 | −8131.36 |

For this sub-range, one of the derivatives has a positive value, and the remaining derivatives have negative values, which indicates the possible presence of an asymptote. The absolute value of the derivative having a sign that is different than the others, in this case the positive value derivative, may then be compared to a predetermined threshold value. If the absolute value exceeds the predetermined threshold value, the determination is made that an asymptote is present. In this example, the predetermined threshold value is 10,000,000. Thus, in this example the absolute value does not exceed the predetermined threshold value.

As a result, additional sample variable values are added between the last initial sample value in the previous sub-range, and the second initial sample variable value in this sub-range, so that this asymptote of the mathematical function can be accurately plotted. In some implementations, a predetermined number of additional sample values are added.

In this example, the predetermined number of samples is fifteen. The additional sample variable values, their corresponding function values and derivative values are summarized in the table below:

| Additional Sample Variable Values | Function Values | Derivative Values |
|---|---|---|
| 7.852262726 | 582.7642508 | |
| 7.85244414 | 651.4083836 | −378383.88 |
| 7.852690058 | 775.2476123 | −503579.36 |
| 7.852757554 | 817.9399915 | −632517.17 |
| 7.852948708 | 969.123295 | −790897.93 |
| 7.853158467 | 1215.819369 | −1176092.91 |
| 7.85344396 | 1860.864531 | −2259407.98 |
| 7.853495918 | 2059.817485 | −3829111.09 |
| 7.85371596 | 3765.014932 | −7749418.05 |
| 7.853955971 | 38967.61429 | −146670774.91 |
| 7.854051055 | −14403.76267 | 561307653.87 |
| 7.854258281 | −3613.710768 | −52069006.31 |
| 7.85447142 | −2040.706466 | −7380180.55 |
| 7.854548562 | −1762.891187 | −3601349.19 |
| 7.854702207 | −1386.783722 | −2447899.15 |

In this example, the absolute value of the derivative having a sign that is different than the others, exceeds the predetermined threshold. As a result, the determination is made that an asymptote is present.

Another sub-range of 'x' for this example is from [6.28000, 6.28133]. The initial sample variable values and corresponding function values for this sub-range is summarized in the following table:

| Initial Sample Variable Values | Function Values |
|---|---|
| 6.280721851 | NaN |
| 6.281772602 | NaN |
| 6.28293283 | NaN |
| 6.284157755 | 0.032156533 |
| 6.285805324 | 0.053806098 |
| 6.28670498 | 0.06284646 |
| 6.2881034 | 0.075047104 |
| 6.290188715 | 0.090689549 |
| 6.290750038 | 0.094539921 |
| 6.29312915 | 0.109662169 |

For this sub-range, the function values are undefined for the first three initial sample variable values. As a result, one or more additional sample variable values are added between the third initial sample value of 6.28293283 that is undefined, and the fourth initial sample value of 6.284157755, so that this transition from undefined to defined function values can be accurately plotted. In some implementations, this transition is determined by performing a binary search over a predetermined number of iterations. In this example, the predetermined number of iterations is fifteen. The additional sample variable values and their corresponding function values for the various iterations of the binary search are summarized in the table below:

| Additional Sample Variable Values | Function Values |
|---|---|
| 6.283545292 | 0.019333254 |
| 6.283239061 | 0.007385448 |
| 6.283085945 | NaN |
| 6.283162503 | NaN |
| 6.283200782 | 0.003949282 |
| 6.283181643 | NaN |
| 6.283191212 | 0.002435949 |
| 6.283186427 | 0.00105954 |
| 6.283184035 | NaN |
| 6.283185231 | NaN |
| 6.283185829 | 0.000723117 |
| 6.28318553 | 0.000472547 |
| 6.283185381 | 0.000271298 |
| 6.283185306 | NaN |
| 6.283185343 | 0.000190249 |

The additional sample variable value with the lowest function value can then selected for use in plotting the sub-range. In some implementations, if this additional sample variable value does not have the minimum or maximum function value for the sub-range, it may not be selected for use in plotting.

While the present invention is disclosed by reference to the implementations and examples detailed above, it is understood that these examples are intended in an illustrative rather than in a limiting sense. Computer-assisted processing is implicated in the described implementations. Accordingly, the present technologies may be embodied in methods for providing an interactive plot of a mathematical function within a search results web page, systems including logic and resources to provide an interactive plot of a mathematical function within a search results web page, systems that take advantage of computer-assisted methods for providing an interactive plot of a mathematical function within a search results web page, media impressed with logic to provide an interactive plot of a mathematical function within a search results web page, data streams impressed with logic to provide an interactive plot of a mathematical function within a search results web page, or computer-accessible services that carry out computer-assisted methods for providing an interactive plot of a mathematical function within a search results web page. It is contemplated that modifications and combinations will be within the scope of the following claims.

We claim as follows:
1. A method comprising:
dividing, using a computing device, a range of variable values of an independent variable in a mathematical function into a plurality of sub-ranges;
selecting, by the computing device, a plurality of initial variable sample values within a particular sub-range of the plurality of sub-ranges;
calculating, by the computing device, function values for corresponding initial variable sample values of the plurality of initial variable sample values within the particular sub-range;
determining, by the computing device and based on the particular sub-range, that a difference between the calculated function values exceeds a threshold value;
modifying, by the computing device, the particular sub-range by adding a plurality of additional sample variable values to the particular sub-range based on the determination,
adding the plurality of additional sample variable values to the particular sub-range including:
calculating function values for the plurality of additional sample variable values, within the particular sub-range, until a difference between the calculated function values for the plurality of additional sample variable values is less than the threshold value; and
plotting, by the computing device, a graph of the mathematical function on a web page based on the modified particular sub-range.

2. The method of claim 1, wherein:
the determining comprises:
determining that a pair of initial sample variable values have a difference between corresponding calculated function values that exceeds the threshold value; and
the modifying the particular sub-range comprises:
adding at least one of the plurality of additional sample variable values between the initial sample variable values in the pair.

3. The method of claim 1, wherein the determining comprises:
determining that a difference between one or more derivatives of the calculated function values exceeds the threshold value.

4. The method of claim 3, wherein determining the difference between the one or more derivatives comprises:
determining that one derivative has one of a positive value or a negative value, and
determining that one or more other derivatives have the other of the positive value or the negative value.

5. The method of claim 1, further comprising:
selecting points from among the calculated function values, the corresponding initial variable sample values, and the plurality of additional sample variable values within the particular sub-range for use in plotting the mathematical function; and
rejecting points for use in plotting the mathematical function that have function values that are undefined for corresponding sample variable values,
wherein plotting the graph includes:
providing, for display, the selected points on the plotted graph without providing, for display, the rejected points on the plotted graph.

6. The method of claim 1, further comprising:
selecting a second plurality of initial variable sample values within a second sub-range of the plurality of sub-ranges;
calculating function values for corresponding initial variable sample values of the second plurality of initial variable sample values within the second sub-range;
determining that a difference between the calculated function values within the second sub-range is less than a second threshold value; and
determining one or more approximate points for use in plotting the mathematical function within the second sub-range,
the one or more approximate points having values based on the calculated function values within the second sub-range, and
wherein plotting the graph includes:
providing, for display, the one or more approximate points for the second sub-range.

7. The method of claim 6, wherein determining the one or more approximate points includes:
determining an approximate point having a value that is an average of a minimum function value and a maximum function value within the second sub-range.

8. The method of claim 1, wherein the web page is a search results web page received based on a query representing the mathematical function.

9. The method of claim 1, wherein the range of variable values of the independent variable represents an extent of a display region of the plotted graph of the mathematical function within the plotted graph, and the method further comprises:

determining supplementary points of the mathematical function having function values for corresponding values of the independent variable outside the range;
receiving a user interaction with the plotted graph,
the user interaction corresponding to a request to change the display region of the plotted graph of the mathematical function; and
changing the display region of the plotted graph to include the supplementary points based on the request.

10. The method of claim 1, further comprising:
receiving a query representing the mathematical function; and
providing, for display on the web page, the plotted graph and one or more search results associated with the query.

11. The method of claim 10, wherein the one or more search results associated with the query include one or more selectable links to one or more documents associated with the query.

12. The method of claim 1, wherein, when determining that the difference between the calculated function values exceeds the threshold value, the method includes:
determining that a difference between a minimum function value, of the calculated function values, and a maximum function value, of the calculated function values, exceeds the threshold value.

13. A non-transitory computer readable storage medium storing computer instructions, the instructions comprising:
one or more instructions which, when executed by a processor, cause the processor to:
receive a query representing a mathematical function;
divide a range of variable values of an independent variable in the mathematical function into a plurality of sub-ranges;
select a plurality of initial variable sample values within a particular sub-range of the plurality of sub-ranges;
calculate function values for corresponding initial variable sample values of the plurality of initial variable sample values within the particular sub-range;
determine, based on the particular sub-range, that a difference between the calculated function values exceeds a threshold value;
modify the particular sub-range by adding a plurality of additional sample variable values to the particular sub-range based on the determination,
the one or more instructions to add the plurality of additional sample variable values including:
one or more instructions to calculate function values for the plurality of additional sample variable values, within the particular sub-range, until a difference between the calculated function values for the plurality of additional sample variable values is less than the threshold value;
plot a graph of the mathematical function on a web page based on the modified particular sub-range; and
provide, for display on the web page, the plotted graph.

14. The non-transitory computer readable storage medium of claim 13, wherein:
the one or more instructions to determine the difference include:
one or more instructions to determine that a pair of initial sample variable values have a difference between corresponding calculated function values that exceeds the threshold value; and
the one or more instructions to modify the particular sub-range include:

one or more instructions to add at least one of the plurality of additional sample variable values between the initial sample variable values in the pair.

15. The non-transitory computer readable storage medium of claim 13, wherein the one or more instructions to determine the difference include:
one or more instructions to determine that a difference between one or more derivatives of the calculated function values exceeds the threshold value.

16. The non-transitory computer readable storage medium of claim 15, wherein one or more instructions to determine the difference between the one or more derivatives include:
one or more instructions to determine that one derivative has one of a positive value or a negative value, and
one or more instructions to determine that one or more other derivatives have the other of the positive value or the negative value.

17. The non-transitory computer readable storage medium of claim 13, wherein the instructions further include:
one or more instructions to select points from among the calculated function values, the corresponding initial variable sample values, and the plurality of additional sample variable values within the particular sub-range for use in plotting the mathematical function; and
one or more instructions to reject points for use in plotting the mathematical function that have function values that are undefined for corresponding sample variable values, wherein the one or more instructions to plot the graph include:
one or more instructions to provide, for display, the selected points on the plotted graph without providing, for display, the rejected points on the plotted graph.

18. The non-transitory computer readable storage medium of claim 13, wherein the instructions further include:
one or more instructions to select a second plurality of initial variable sample values within a second sub-range of the plurality of sub-ranges;
one or more instructions to calculate function values for corresponding initial variable sample values of the second plurality of initial variable sample values within the second sub-range;
one or more instructions to determine that a difference between the calculated function values within the second sub-range is less than a second threshold value; and
one or more instructions to determine one or more approximate points for use in plotting the mathematical function within the second sub-range,
the one or more approximate points having values based on the calculated function values within the second sub-range, and
the one or more instructions to plot the graph including:
one or more instructions to provide, for display, the one or more approximate points for the second sub-range.

19. The non-transitory computer readable storage medium of claim 18, wherein the one or more instructions to determine the one or more approximate points include:
one or more instructions to determine an approximate point having a value that is an average of a minimum function value and a maximum function value within the second sub-range.

20. The non-transitory computer readable storage medium of claim 13, wherein the web page is a search results web page based on the query representing the mathematical function.

21. The non-transitory computer readable storage medium of claim 13, wherein the range of variable values of the independent variable represents an extent of a display region of the plotted graph of the mathematical function within the plotted graph, and the instructions further include:
one or more instructions to determine supplementary points of the mathematical function having function values for corresponding values of the independent variable outside the range;
one or more instructions to receive a user interaction with the plotted graph,
the user interaction corresponding to a request to change the display region of the plotted graph of the mathematical function; and
one or more instructions to change the display region of the plotted graph to include the supplementary points based on the request.

22. The non-transitory computer readable storage medium of claim 13, wherein the one or more instructions to provide, for display on the web page, the plotted graph include:
one or more instructions to provide, for display on the web page, the plotted graph and one or more search results associated with the query.

23. The non-transitory computer readable storage medium of claim 22, wherein the one or more search results associated with the query include one or more selectable links to one or more documents associated with the query.

24. The non-transitory computer readable storage medium of claim 13, wherein the one or more instructions to determine that the difference between the calculated function values exceeds the threshold value include:
one or more instructions to determine that a difference between a minimum function value, of the calculated function values, and a maximum function value, of the calculated function values, exceeds the threshold value.

25. A system comprising:
one or more devices, including memory and at least one processor, to:
receive a query representing a mathematical function;
divide a range of variable values of an independent variable in the mathematical function into a plurality of sub-ranges;
select a plurality of initial variable sample values within a particular sub-range of the plurality of sub-ranges;
calculate function values for corresponding initial variable sample values of the plurality of initial variable sample values within the particular sub-range;
determine, based on the particular sub-range, that a difference between the calculated function values exceeds a threshold value;
modify the particular sub-range by adding a plurality of additional sample variable values to the particular sub-range based on the determination,
the one or more devices, when adding the plurality of additional sample variable values, being to:
calculate function values for the plurality of additional sample variable values, within the particular sub-range, until a difference between the calculated function values for the plurality of additional sample variable values is less than the threshold value;
plot a graph of the mathematical function on a web page based on the modified particular sub-range; and
provide, for display on the web page, the plotted graph.

26. The system of claim 25, wherein:
the one or more devices, when determining the difference, are further to:

determine that a pair of initial sample variable values have a difference between corresponding calculated function values that exceeds the threshold value; and the one or more devices, when modifying the particular sub-range, are further to:

add at least one of the plurality of additional sample variable values between the initial sample variable values in the pair.

27. The system of claim 25, wherein the one or more devices, when determining the difference, are further to:

determine that a difference between a minimum function value, of the calculated function values, and a maximum function value, of the calculated function values, within the particular sub-range exceeds the threshold value.

28. The method of claim 25, wherein the one or more devices, when determining that the difference between the calculated function values exceeds the threshold value, are further to:

determine that a difference between one or more derivatives of the calculated function values exceeds the threshold value.

29. The system of claim 28, wherein the one or more devices, when determining the difference between the one or more derivatives, are further to:

determine that one derivative has one of a positive value or a negative value, and determine that one or more other derivatives have the other of the positive value or the negative value.

30. The system of claim 25, wherein the one or more devices are further to:

select points from among the calculated function values, the corresponding initial variable sample values, and the additional sample variable value within the particular sub-range for use in plotting the mathematical function; and reject points for use in plotting the mathematical function that have function values that are undefined for corresponding sample variable values, and the one or more devices, when plotting the graph, are further to:

provide, for display, the selected points on the plotted graph without providing, for display, the rejected points on the plotted graph.

31. The system of claim 25, wherein the one or more devices are further to:

select a second plurality of initial variable sample values within a second sub-range of the plurality of sub-ranges;

calculate function values for corresponding initial variable sample values of the second plurality of initial variable sample values within the second sub-range;

determine that a difference between the calculated function values within the second sub-range is less than a second threshold value; and determine one or more approximate points for use in plotting the mathematical function within the second sub-range, the one or more approximate points having values based on the calculated function values within the second sub-range, and the one or more devices, when plotting the graph, being further to:

provide, for display, the one or more approximate points for the second sub-range.

32. The system of claim 31, wherein the one or more devices, when determining the one or more approximate points, are further to:

determine an approximate point having a value that is an average of a minimum function value and a maximum function value within the second sub-range.

33. The system of claim 25, wherein the web page is a search results web page received based on the query representing the mathematical function.

34. The system of claim 25, wherein the range of variable values of the independent variable represent an extent of a display region of the plotted graph of the mathematical function within the plotted graph, and wherein the one or more devices are further to:

determine supplementary points of the mathematical function having function values for corresponding values of the variable outside the range;

receive a user interaction with the plotted graph, the user interaction corresponding to a request to change the display region of the plotted graph of the mathematical function; and change the display region of the plotted graph to include supplementary points based on the request.

35. The system of claim 25, wherein the one or more devices, when providing, for display on the web page, the plotted graph, are further to:

provide, for display on the web page, the plotted graph and one or more search results associated with the query.

36. The system of claim 35, wherein the one or more search results associated with the query include one or more selectable links to one or more documents associated with the query.

* * * * *